(12) United States Patent
DeGroot et al.

(10) Patent No.: US 11,795,005 B2
(45) Date of Patent: Oct. 24, 2023

(54) HYGIENIC CONVEYOR ROLLER

(71) Applicant: Laitram, L.L.C., Harahan, LA (US)

(72) Inventors: Michael Hendrik DeGroot, Rockford, MI (US); Paul A. Marsman, Hudsonville, MI (US)

(73) Assignee: Laitram, L.L.C., Harahan, LA (US)

( * ) Notice: Subject to any disclaimer, the term of this patent is extended or adjusted under 35 U.S.C. 154(b) by 67 days.

(21) Appl. No.: 17/510,813

(22) Filed: Oct. 26, 2021

(65) Prior Publication Data

US 2022/0153528 A1    May 19, 2022

Related U.S. Application Data

(60) Provisional application No. 63/115,707, filed on Nov. 19, 2020.

(51) Int. Cl.
*B65G 39/02*    (2006.01)
*B65G 23/04*    (2006.01)
*B65G 23/06*    (2006.01)

(52) U.S. Cl.
CPC .......... *B65G 39/02* (2013.01); *B65G 2207/26* (2013.01)

(58) Field of Classification Search
None
See application file for complete search history.

(56) References Cited

U.S. PATENT DOCUMENTS

| | | | |
|---|---|---|---|
| 5,117,970 A | 6/1992 | Gibbs | |
| 5,322,478 A * | 6/1994 | Bos | B65G 23/06 474/96 |
| 6,074,316 A * | 6/2000 | Murrietta, Sr. | F16H 55/30 474/96 |
| 6,910,571 B1 * | 6/2005 | Ertel | B65G 21/105 492/38 |
| 9,527,672 B2 | 12/2016 | Batchelder et al. | |
| 9,751,697 B2 | 9/2017 | Ma | |
| 10,605,347 B2 | 3/2020 | Larson | |
| 11,021,330 B2 | 6/2021 | Kokx | |
| 11,192,723 B2 | 12/2021 | DeGroot et al. | |
| 2011/0062000 A1 | 3/2011 | Yamamoto | |

FOREIGN PATENT DOCUMENTS

GB                633133 A    12/1949

OTHER PUBLICATIONS

Extended European Search Report, European Application No. 21206033.9, dated Apr. 11, 2022, European Patent Office, Munich, Germany.

* cited by examiner

*Primary Examiner* — Kavel Singh
(74) *Attorney, Agent, or Firm* — Catherine M. Bishop

(57) ABSTRACT

A hygienic, cleanable conveyor roller for use in a conveyor includes a segmented hub, a plurality of spokes and a rim for contacting a conveyor belt. The segmented hub comprises a plurality of arcuate segments in different axial planes connected to each other. The conveyor roller is mounted upon and rotatable about a mounting shaft that may axially constrain the roller. During a single revolution of the conveyor roller about the mounting shaft, all surfaces of both the conveyor roller and the mounting shaft are fully exposed, allowing the surfaces to be cleaned in place, without requiring removal of the conveyor roller from the mounting shaft.

16 Claims, 8 Drawing Sheets

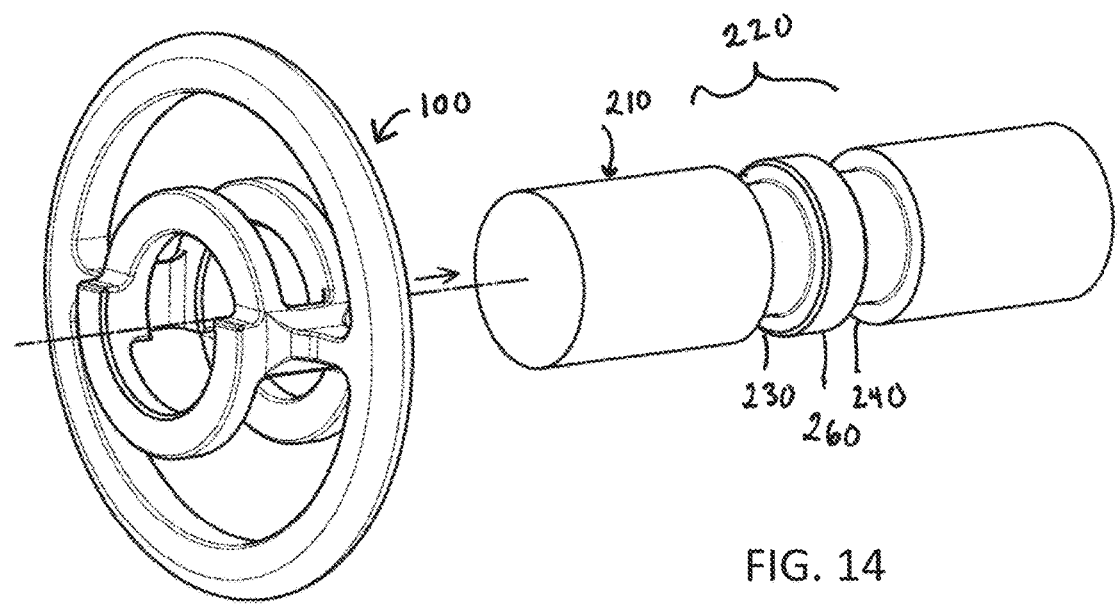
FIG. 14
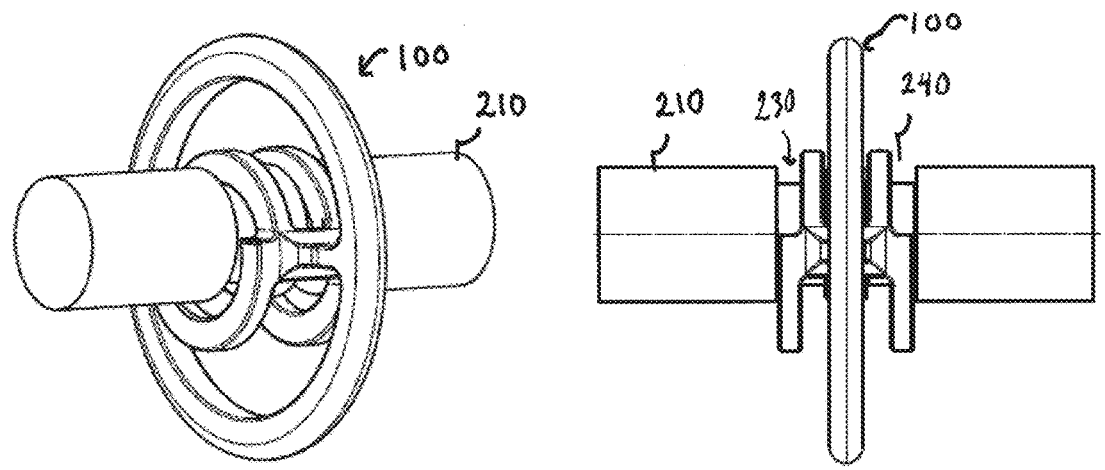
FIG. 15
FIG. 16

HYGIENIC CONVEYOR ROLLER

RELATED APPLICATIONS

The present application claims priority to U.S. Provisional Patent Application No. 63/115,707, filed Nov. 19, 2020, and entitled "Hygienic Conveyor Roller", the contents of which are herein incorporated by reference.

FIELD OF THE INVENTION

The present application relates to power-driven conveyors. More particular, the present invention relates to rollers used to support a conveyor belt in a returnway, infeed or another location where a conveyor belt requires support.

BACKGROUND OF THE INVENTION

Conveyor belts are used in many industries to convey products from first location to a second location. Conveyor belts generally form an endless belt loop that is trained around drive and idler sprockets or rollers at each end of a conveying path. Articles are conveyed atop the conveyor belt are supported along an upper carryway. The conveyor belt returns along a lower returnway. To minimize the maximum sag of the conveyor belt in the returnway, return shoes or rollers are often used. Return rollers typically extend across the width of the conveyor belt at selected positions along the returnway. Rollers may also be used to support a conveyor belt at the infeed end of the endless conveyor belt circuit and—or another location. Traditionally, many applications use full width rollers that extend along the width of the conveyor belt. However, in food-related applications, the full width roller contacts the entire surface of the conveyor belt and can smear and co-mingle remaining food product on the surface of the belt, compromising food safety.

One option in use is a stationary stainless-steel mounting shaft with multiple reduced diameter journals. Plastic disks with bores of a similar diameter to the shaft can be slid over the shaft and positioned into the journals. An advantage of this solution is that the conveyor belt is supported but has limited contact between the roller and the belt surface, improving food safety.

A drawback to the roller disks is that they create potential sandwiches between the inner diameter of the roller and the outer diameter of the shaft journal. These sandwiches cannot be cleaned in place while the belt is running and must be manually lifted and removed to clean both the shaft the and entire surface of the roller disk.

To simplify the cleaning of these rollers in place, clearance is added either to the bore of the roller or the length of the shaft journal. While this does not enable a complete clean in place solution, it does enable some cleaning of the roller while still situated on the shaft. However, the additional clearances also enable the roller to move axially and to also tip when exposed to lateral forces, creating instability.

SUMMARY OF THE INVENTION

A hygienic, cleanable conveyor roller for use in a conveyor includes a segmented hub, a plurality of spokes and a rim for contacting a conveyor belt. The segmented hub comprises a plurality of arcuate segments in different axial planes connected to each other to form a hub with an axial bore for receiving a mounting shaft. The conveyor roller is mounted upon and rotatable about a mounting shaft that may axially constrain the roller. During a single revolution of the conveyor roller about the mounting shaft, all surfaces of both the conveyor roller and the mounting shaft are fully exposed, allowing the surfaces to be cleaned in place, without requiring removal of the conveyor roller from the mounting shaft.

According to one aspect, a roller for a conveyor comprises a segmented hub formed of a plurality of overlapping and connected segments to form an opening for receiving a shaft about which the conveyor roller is mounted, at least one spoke extending radially from the segmented hub and a rim connected to the segmented hub via the at least one spoke.

According to another aspect, a roller assembly for a conveyor comprises a mounting shaft including a cylindrical body extending along an axis and a mounting region formed in the body and a conveyor roller rotatably mounted in the mounting region. The conveyor roller comprises a segmented hub formed of a plurality of overlapping and connected segments to form an opening for receiving the mounting shaft, at least one spoke extending radially from the segmented hub and a rim connected to the segmented hub via the at least one spoke.

BRIEF DESCRIPTION OF THE DRAWINGS

FIG. 14 is an isometric view of the conveyor roller of FIG. 2 during mounting of the conveyor roller on a mounting shaft according to another embodiment;

FIG. 15 is an isometric view of the conveyor roller of FIG. 14 in a first mounted position on the mounting shaft;

FIG. 16 is a front view of the conveyor roller and mounting shaft of FIG. 15;

DETAILED DESCRIPTION

Figure 1:
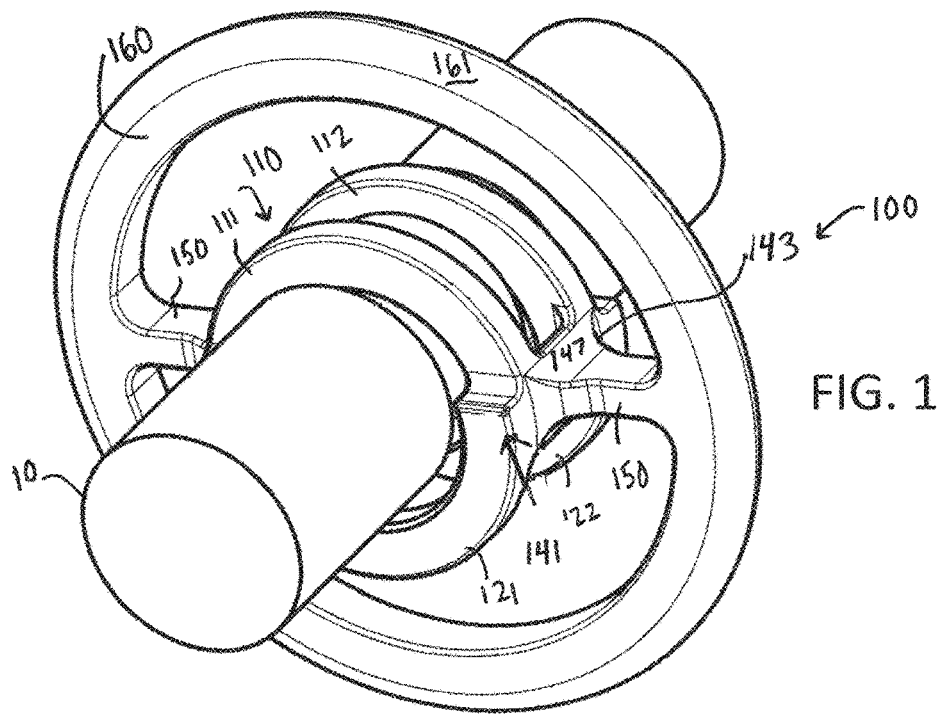
FIG. 1 is an isometric view of a conveyor roller including a segmented hub mounted on a mounting shaft according to an embodiment.

A hygienic conveyor roller includes a segmented hub connected to a rim with spokes. The invention will be described below relative to certain illustrative embodiments, though those skilled in the art will recognize that the invention is not limited to the described embodiments.

Referring to FIGS. 1-8, a conveyor roller 100 is mounted on and rotatable about a mounting shaft 10 in a conveyor. In one embodiment, the conveyor roller is a returnway roller, mounted in the returnway of a conveyor for guiding and—or supporting the conveyor belt as it travels from the outfeed, discharge end, back to the infeed of the conveyor. As the conveyor belt moves over the outer rim 160 of the conveyor roller 100, it may spin the conveyor roller 100 about the shaft 10. One skilled in the art will recognize that the illustrative conveyor roller 100 may be implemented in any suitable location in a conveyor, such as the infeed or other suitable location where support of a conveyor belt is useful.

The conveyor roller 100 comprises a segmented hub 110 that is mounted on and rotatable about the shaft 10 in a dedicated mounting region 20. The segmented hub 110 comprises a plurality segments in different axial planes that connect to and overlap each other to form a complete, unitary hub that can encircle a mounting shaft 10 and allow rotation of the conveyor roller 100 about the mounting shaft 10.

Spokes 150 extend radially from the segmented hub 110 and connect the segmented hub 110 to the outer rim 160, the outer surface 161 of which contacts and supports a conveyor belt. The illustrative conveyor roller 100 includes two spokes 150 in line with and parallel to each other and radially offset from each other by 180°, but the invention is not so limited. For example, more spokes may be used to connect the segmented hub 110 to the rim 160. Alternatively, webbing or another suitable connector may connect the segmented hub 110 to the rim 160.

The illustrative segmented hub 110 comprises a first arcuate segment 111 and a second arcuate 112 segment parallel to and spaced from the first arcuate segment 111. The first and second arcuate sections are equally spaced from a central vertical plane 50 that bisects the roller 100, and mirror each other across the central vertical plane 50. A third arcuate segment 121 is radially and axially offset from the first arcuate segment 111, such that the ends of the first arcuate segment 111 overlap and connect with the ends of the third arcuate section to form first and second overlapping portions 140, 141. A fourth arcuate segment 122 is radially and axially offset from the second arcuate segment 112, such that the ends of the second arcuate segment 112 overlap and connect with the ends fourth arcuate segment 122 to form third and fourth overlapping portions 142, 143.

In the illustrative embodiment, the shape and size of the arcuate segments are substantially identical, with each segment spanning greater than 180°, so that the overlapping and offset segments 111, 112, 121, 122 form a complete circumference having an axial bore with a substantially circular cross-section that is slightly bigger than the outer diameter of the shaft 10 to allow the segmented hub 110 to slide over the main body of the mounting shaft 10.

Alternatively, three, four or more offset, overlapping and connected segments may form a complete circumference forming an axial bore for receiving the mounting shaft 10.

A first bridging segment 146 extends between the first arcuate segment 111 and the second arcuate segment 112. The illustrative first bridging segment 146 extends between the first overlapping portion 140 and the third overlapping portions 142 to connect the first and second arcuate sections 111, 112 to the third and fourth arcuate sections 121, 122. However, the first bridging segment 146 may be radially offset from the overlapping portions 140, 142, and—or extend between any suitable locations of the arcuate segments 111, 112, 121, 122.

A second bridging segment 147 extends the first arcuate segment 111 and the second arcuate segment 112 at a second location. The illustrative second bridging segment 147 extends between the second overlapping portion 141 and the fourth overlapping portion 143 to further connect the connect the first and second arcuate sections 111, 112 to the third and fourth arcuate sections 121, 122 at the opposite end. The second bridging segment 147 can be radially offset from the overlapping portions 142, 143 and—or extend between any suitable locations to connect the arcuate segments 111, 112, 121, 122 together.

Each illustrative spoke 150 extends from the radially outer side of the associated bridging segment 146, 147. Alternatively, the spokes 150 or other suitable segmented hub-to-rim connector may be located in a different location or various locations, and the invention is not limited to spokes extending from bridging segments on the segmented hub 110.

Figure 2:
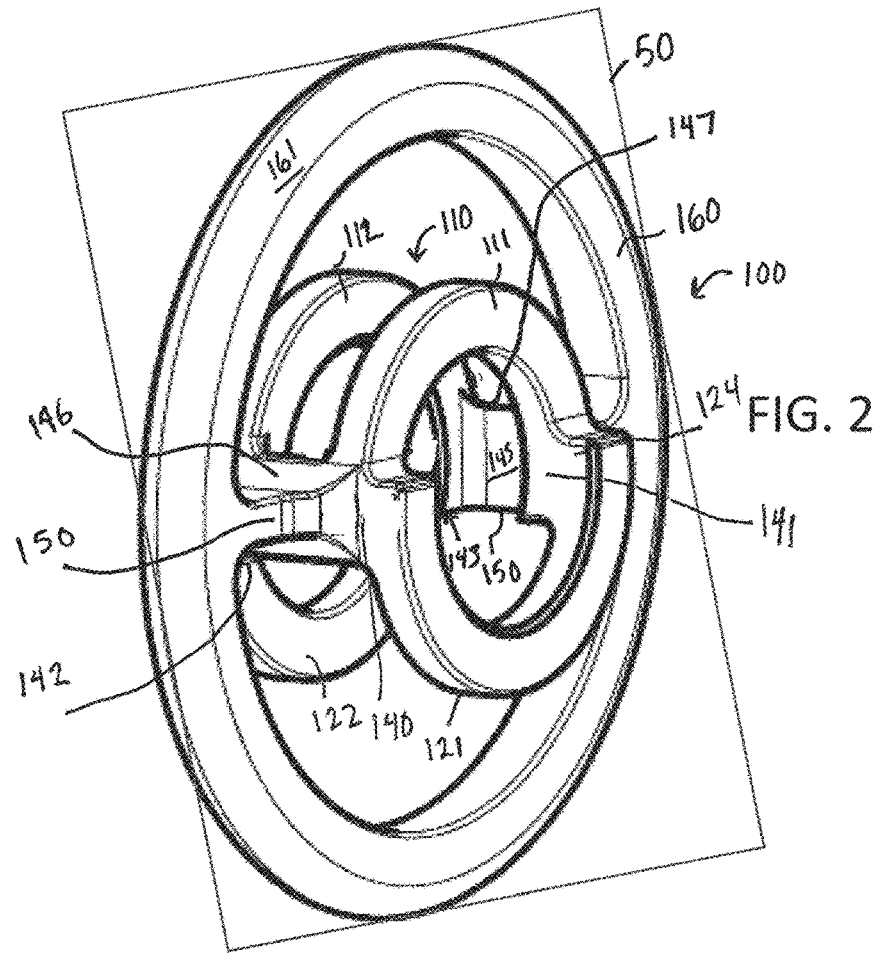
FIG. 2 is an isometric view of the conveyor roller of FIG. 1.

As shown in FIG. 2, the radially inner surface 145 of each of the bridging segments 146, 147 is radially offset outwards from the radially inner surfaces of the arcuate segments to provide clearance.

The illustrative conveyor roller 100 has mirror image symmetry across the plane 50, which bisects the rim 160.

Figure 3:
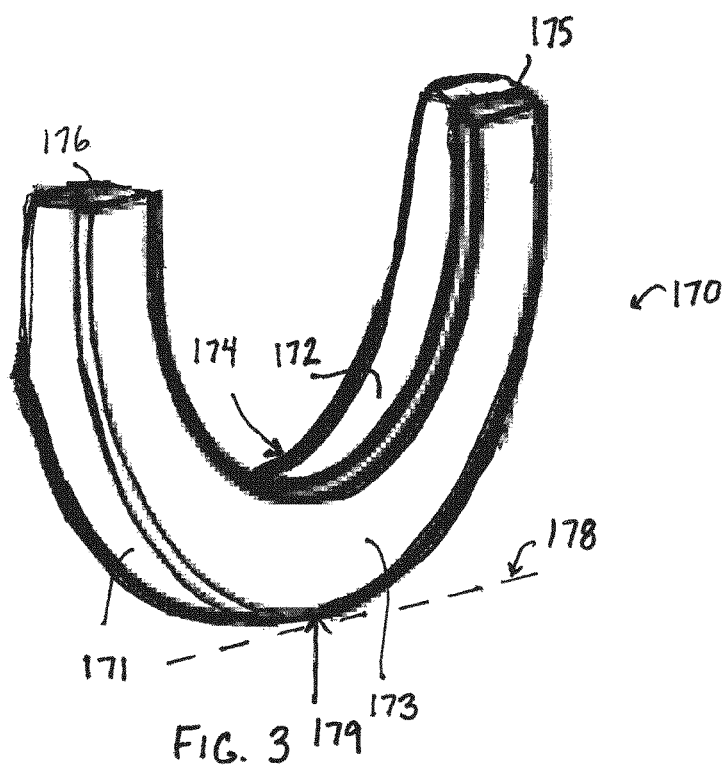
FIG. 3 is an isometric view of an isolated arcuate segment of the segmented hub of the conveyor roller of FIG. 1.
Figure 4:
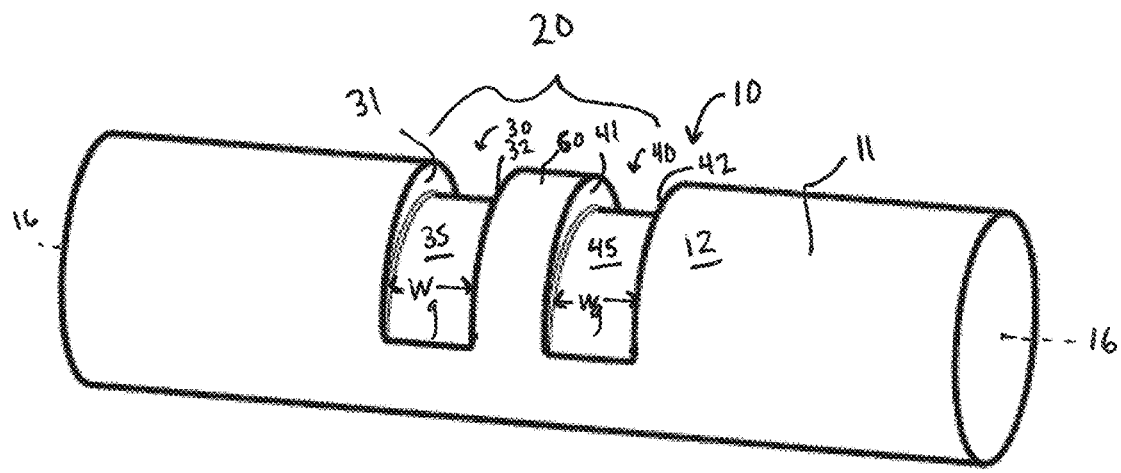
FIG. 4 is an isometric view of a mounting shaft with a mounting region suitable for mounting the conveyor roller of FIG. 2.
Figure 7:
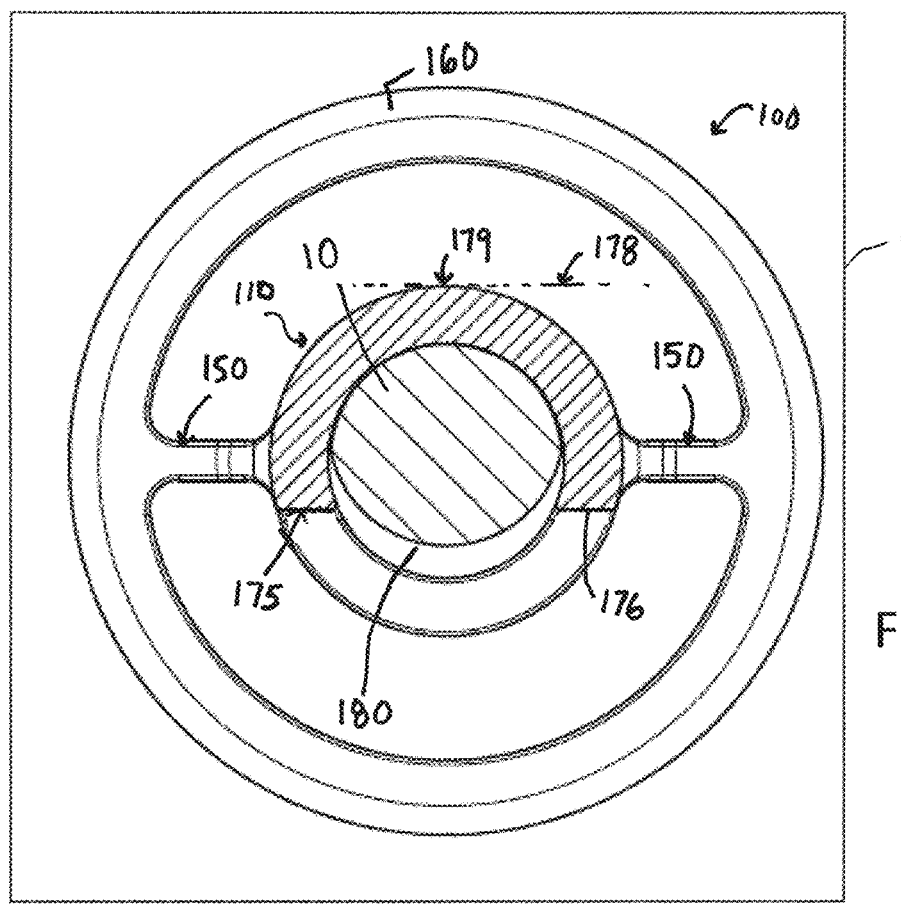
FIG. 7 is a cross-sectional view of the conveyor roller and mounting shaft of FIG. 1 through an axial plane that bisects the conveyor roller.
Figure 8:
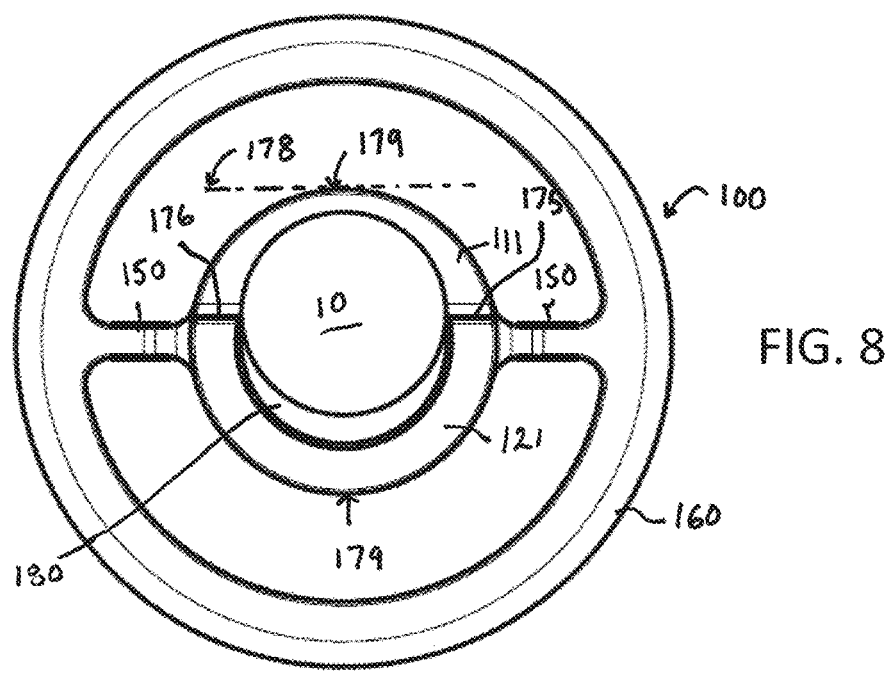
FIG. 8 is a side view of the conveyor roller and mounting shaft of FIG. 1.

FIG. 3 shows an isolated arcuate segment 170 representing each arcuate segment 111, 112, 121 and—or 122 according to an embodiment. The illustrative arcuate segment 170 includes a radially outer surface 171, a radially inner surface 172, an axially outer surface 173, an axially inner surface 174 and end surfaces 175, 176. The illustrative arcuate segment spans more than 180°, so that the ends 175, 176 are separated by less than 180°, but the invention is not so limited. The illustrative arcuate segment has a rectangular or square cross-section, with flat axially inner and outer surfaces 173, 174. Shaped connecting surfaces may connect the arcuate segment to an adjacent arcuate segment to prevent crevices and smooth the interface between the segments. The illustrative end surfaces 175, 176 extend parallel to a line 178 extending tangent to the apex 179 of the arcuate segment. In this manner, when the apex 179 is at its topmost point, the end surfaces 175, 176 are horizontal, as shown in FIGS. 7 and 8. The ends 175, 176 of one or more of the arcuate segment may be chamfered.

While FIG. 3 shows an arcuate segment 170 in isolation, the illustrative conveyor roller 100 comprises a segmented hub 110 in which the segments 111, 112, 121, 122 are integrally formed through injection molding, compression molding or another suitable process. The entire conveyor roller 100 may be integrally formed through injection molding, compression molding or another suitable process. Alternatively, one or more portions or segments of the conveyor roller 100 may be separately formed and then connected together.

The conveyor roller 100 is configured to receive a mounting shaft 10 that axially and radially constrains the movement of the conveyor roller 100, while allowing rotation of the conveyor roller 100 about the mounting shaft 10. In one embodiment, shown in FIG. 4, the shaft 10 comprises a cylindrical body 11 with an outer surface 12 and extending along an axis 16. The mounting shaft 10 includes one or more mounting regions 20, each capable of mounting a conveyor roller 100. The illustrative mounting region 20 comprises a first eccentric radial groove 30 and a second eccentric radial groove 40 parallel to and separated from the first eccentric radial groove 30 by a ridge 60. The illustrative outer surface of the ridge 60 matches the outer surface 12 of the cylindrical body 11, but could alternatively be inset or offset from the outer surface 12.

Figure 5:
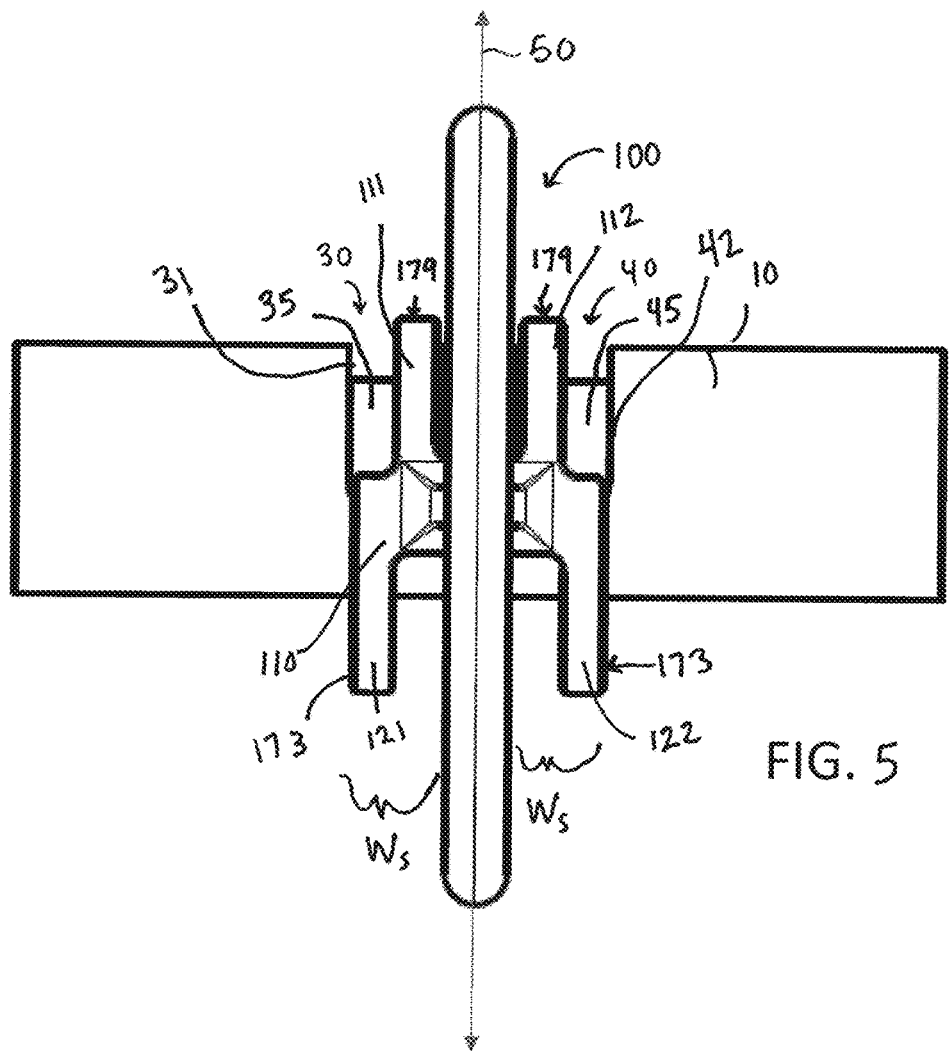
FIG. 5 is a front view of the conveyor roller and mounting shaft of FIG. 1.
Figure 6:
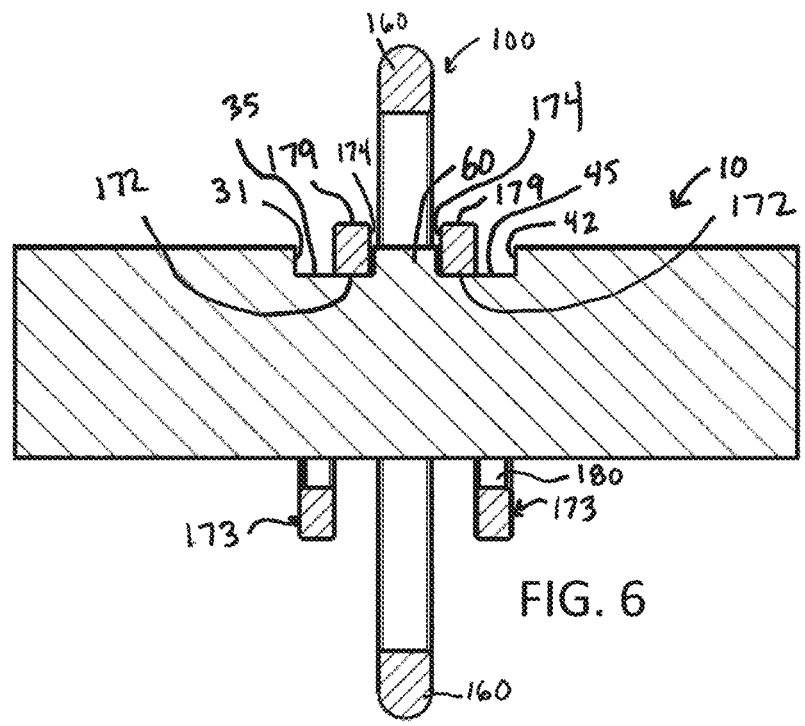
FIG. 6 is a cross-sectional front view of FIG. 5.

The illustrative eccentric radial grooves 30, 40 form a plurality of crescent-shaped flat side surfaces 31, 32, 41, 42 extending perpendicular to the axis 16 of the mounting shaft 10. The radial outer surfaces 35, 45 of the grooves 30, 40 are inset from the outer surface 12 of the main body of the mounting shaft 10. The grooves 30, 40 each have an axial width $W_g$ that is slightly larger than the combined width $W_s$ of each of the paired segments 111, 121 and 112, 122, as shown in FIG. 5.

FIGS. 5-8 show the conveyor roller 100 is mounted on the mounting shaft 10 in the mounting region 20 in a first position, with the first and second arcuate segments 111, 112 circumscribing the top of the mounting shaft 10, such that the apexes 179 of the first and second arcuate segments are at a topmost point. In this first position, the third and fourth arcuate segments 121, 122 circumscribe the bottom of the mounting shaft 10. The axially inner surfaces 174 of the first and second arcuate segments are constrained by the inner side surfaces 32, 41 on the ridge 60. The inner radial surfaces 172 of the first and second arcuate segments 111, 112 ride over the radial outer surfaces 35, 45 of the grooves 30, 40. Outer axial surfaces of third and fourth segments 173 reach to the outer side surfaces 31, 42 of the grooves. The segmented hub 110 provides a clearance space 180 between the third and fourth arcuate segments 121, 122 and the bottom of the mounting shaft 10.

Referring to FIGS. 9-13, the conveyor roller 100 can be easily mounted on the mounting shaft 10 without tools and rotate about the mounting shaft during operation. During each revolution of the conveyor roller 100 about the mounting shaft 10, all surfaces of the segmented hub 110 and mounting region 20 of the mounting shaft 10 are exposed to enable cleaning, without requiring the conveyor roller 100 to be dismounted from the mounting shaft 10.

Figure 9:
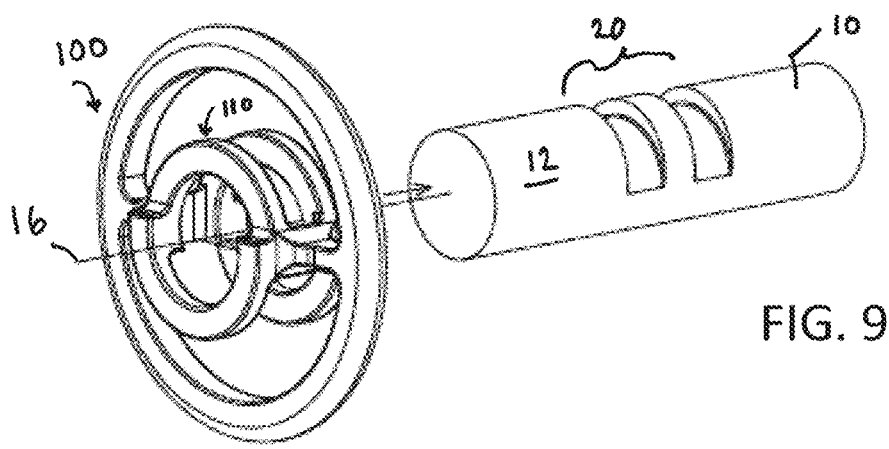
FIG. 9 is an isometric view of the conveyor roller and mounting shaft of FIG. 1 prior to mounting the conveyor roller on the mounting shaft.
Figure 10:
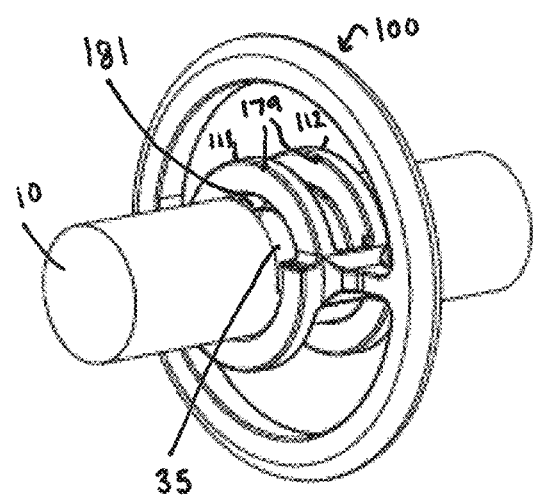
FIG. 10 is an isometric view of the conveyor roller and mounting shaft of FIG. 1 during mounting of the conveyor roller on the mounting shaft.
Figure 11:
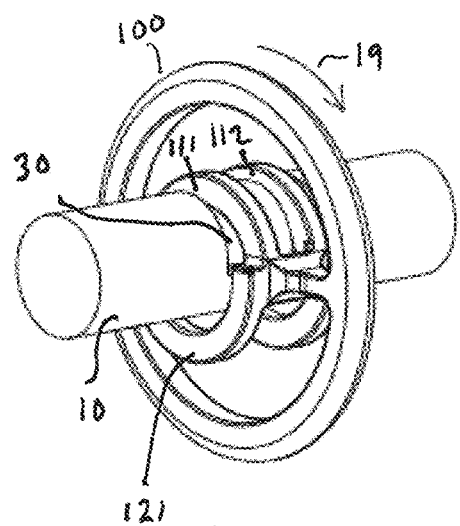
FIG. 11 is an isometric view of the conveyor roller and mounting shaft of FIG. 1 in a first position.

In a first step, shown in FIG. 9, the axial bore of the segmented hub 110 is aligned with the mounting shaft 10 axial axis 16, then slid over the outer periphery 12 of the mounting shaft 10 until it reaches the mounting region 20, as shown in FIG. 10. In the illustrative embodiment, the conveyor roller 100 is mounted with the apexes 179 of the first and second arcuate segments 111, 112 in the topmost position. When centered over the mounting region 20 in such a position, the radially inner surfaces 172 of the arcuate segments 111, 112, 121, 122 are centered about the axis 16 of the mounting shaft, providing clearance 181 between the radially outer surfaces 35, 45 of the grooves 30, 40 and the radially inner surfaces 172 of the first and second arcuate segments 111, 112. When a user releases the conveyor roller 100, the conveyor roller 100 drops into place, such that the axially inner surfaces 174 of the first and second arcuate segments abut the inner side surfaces 32, 41 on the ridge 60, the inner radial surfaces 172 of the first and second arcuate segments 111, 112 sit on the radial outer surfaces 35, 45 of the grooves 30, 40 and the outer axial surfaces of third and fourth segments 173, which circumscribe the bottom of the shaft and are spaced from the bottom of the shaft, reach to the outer side surfaces 41, 42 of the grooves, as shown in FIG. 11. The conveyor roller can alternatively mount in a different position.

Figure 12:
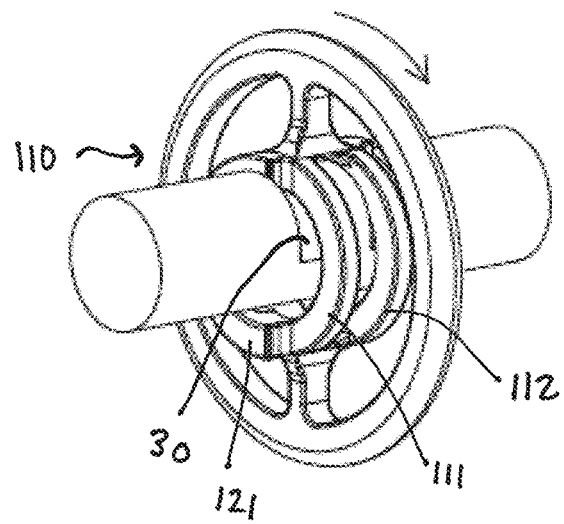
FIG. 12 is an isometric view of the conveyor roller and mounting shaft of FIG. 11 after a quarter-revolution of the conveyor roller about the mounting shaft.
Figure 13:
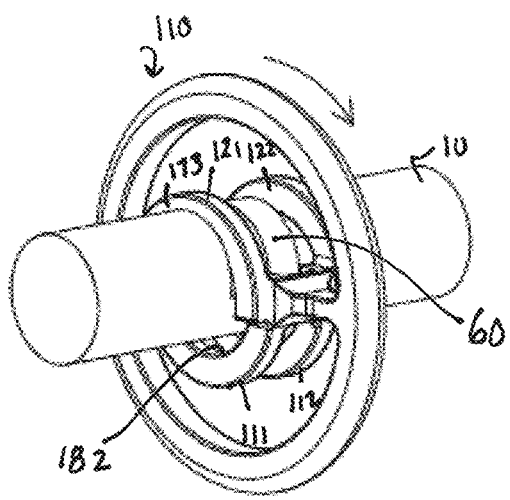
FIG. 13 is an isometric view of the conveyor roller and mounting shaft of FIG. 11 after a half-revolution of the conveyor roller about the mounting shaft.
Figure 17:
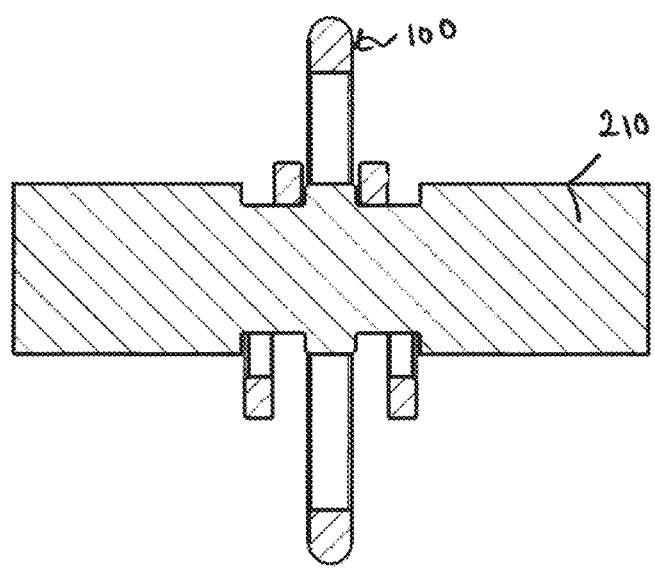
FIG. 17 is a cross-sectional view of the conveyor roller and mounting shaft of FIG. 16.

FIGS. 11-13 show the conveyor roller 100 as it rotates through one-half a revolution in the direction of the arrow 19. After rotation through 90°, as shown in FIG. 12, the segmented hub 110 is oriented with the first and second arcuate sections 111, 112 spanning a side of the mounting shaft, from a top to an opposite bottom, exposing certain surfaces for cleaning. FIG. 13 shows the conveyor roller 100 after it has rotated through an additional 90°, so that the third and fourth arcuate sections 121, 122 are seated in the grooves 30, 40 and circumscribe the top of the mounting shaft 10. In this position, the axially outer surfaces 173 of the third and fourth arcuate sections abut and are constrained by the outer side surfaces 31, 42 of the grooves 30, 40, and additional surface area is exposed for cleaning. The radially inner surfaces 172 of the third and fourth arcuate sections 121, 122 contact and ride over the radially outer surfaces 35, 45 of the grooves. The first and second arcuate sections 111, 112, now circumscribing the bottom of the mounting shaft 10, are spaced from the bottom of the shaft 10 to provide clearance 182 between the radially inner surfaces 172 of the first and second arcuate sections 111, 112 and the mounting shaft 10. As the conveyor roller 100 returns to the first position of FIG. 11, additional surfaces are exposed for cleaning without removing the conveyor roller 100 from the mounting shaft 10.

In any radial position on the mounting shaft 10, the conveyor roller 100 has at least two radially inner surfaces 172 of the arcuate sections 111, 112, 121 and-or 122 in contact with the radially outer surface of the mounting shaft. In addition, in any radial position, the conveyor roller has at least two axial surfaces 173 or 174 of the arcuate sections 111, 112, 121 and—or 122 in contact with or abutting side surfaces 31, 32, 41 and—or 42 of the shaft grooves 30, 40 to constrain the conveyor roller 100 to the mounting region 20 of the shaft.

The conveyor roller 100 can be used with any suitable mounting shaft. In another embodiment, shown in FIGS. 14-17, a mounting shaft 210 can comprise circumferential grooves 230, 240 of constant depth forming a mounting region 220. The grooves 230, 240 are separated by a ridge 260 that circumscribes the mounting shaft. The side surfaces of the grooves 230, 240, which constrain the segmented hub of the mounting roller 100 are annular in shape.

The invention is not limited to the illustrative conveyor roller and—or mounting shaft, and encompasses variations and alterations of these embodiments.

The invention claimed is:

1. A roller for a conveyor, comprising:
    a segmented hub formed of a plurality of arcuate segments in different axial planes that connect to each other and overlap each other at each end of a segment to form a complete, unitary hub defining an opening having a circular cross-section for receiving a shaft about which the roller is mounted;
    at least one spoke extending radially from the segmented hub; and
    a rim connected to the segmented hub via the at least one spoke.

2. A roller as claimed in claim 1, wherein the segmented hub has mirror image symmetry through a central plane that axially bisects the segmented hub.

3. A roller as claimed in claim 1, wherein the segmented hub comprises:
    a first arcuate segment;

a second arcuate segment spaced from and parallel to the first arcuate segment;

a third arcuate segment radially offset from and overlapping the first arcuate segment to form a first overlapping section at a first location, the third arcuate segment disposed axially outward of the first arcuate segment;

a fourth arcuate segment radially offset from and overlapping the second arcuate segment to form a second overlapping section at a second location, the fourth arcuate segment disposed axially outward of the second arcuate segment; and a first bridging segment connecting the first overlapping section to the second overlapping section.

4. A roller as claimed in claim 3, further comprising:

a third overlapping section formed between the first and third arcuate segment at a third location;

a fourth overlapping section formed between the second and fourth arcuate segment at a fourth location; and a second bridging segment connecting the third overlapping segment to the fourth overlapping segment.

5. A roller as claimed in claim 3, wherein the first arcuate segment, second arcuate segment, third arcuate segment and fourth arcuate segment are substantially identical in shape and size.

6. A roller as claimed in claim 5, wherein the first arcuate segment, second arcuate segment, third arcuate segment and fourth arcuate segment each includes a radially inner surface, a radially outer surface, an axially inner surface, an axially outer surface, a first end surface and a second end surface.

7. A roller as claimed in claim 6, wherein the axially inner surface and axially outer surface are flat.

8. A roller as claimed in claim 6, wherein each arcuate segment spans more than 180°.

9. A roller as claimed in claim 8, wherein the second arcuate segment is radially offset from the first arcuate segment by 180°, so that ends of the first and second arcuate segments overlap each other.

10. A roller as claimed in claim 9, wherein the fourth arcuate segment is radially offset from the third arcuate segment by 180°, so that ends of the third and fourth arcuate segments overlap each other.

11. A roller as claimed in claim 6, wherein the first end surface and second end surface extend parallel to a line extending tangent to the apex of the arcuate segment.

12. A roller as claimed in claim 3, wherein a spoke extends from the bridging section to the rim.

13. A roller assembly for a conveyor, comprising:

a mounting shaft including a cylindrical body extending along an axis and a mounting region formed in the cylindrical body; and a conveyor roller rotatably mounted in the mounting region, the conveyor roller comprising a segmented hub formed of a plurality of arcuate segments in different axial planes that connect to each other and overlap each other at each end of a segment to form a complete, unitary hub defining an opening having a circular cross-section for receiving the mounting shaft, at least one spoke extending radially from the segmented hub and a rim connected to the segmented hub via the at least one spoke.

14. A roller assembly as claimed in claim 13, wherein the mounting region comprises:

a first peripheral groove formed in the cylindrical body;

a second peripheral groove formed in the cylindrical body and separated from the first peripheral groove by a ridge.

15. A roller assembly as claimed in claim 14, wherein the first peripheral groove and the second peripheral groove are eccentric to form a plurality of crescent-shaped flat side surfaces extending perpendicular to the axis of the mounting shaft for contacting axial flat surfaces of the segmented hub.

16. A roller assembly as claimed in claim 14, wherein the first and second peripheral groove extend about the circumference of the mounting shaft and have a consistent depth to form flat ring-shaped surfaces for extending perpendicular to the axis of the mounting shaft for contacting axial flat surfaces of the segmented hub.

\* \* \* \* \*